June 17, 1924.
E. H. KOENIG ET AL
1,498,043
TRACTION LUG
Filed Nov. 14, 1922
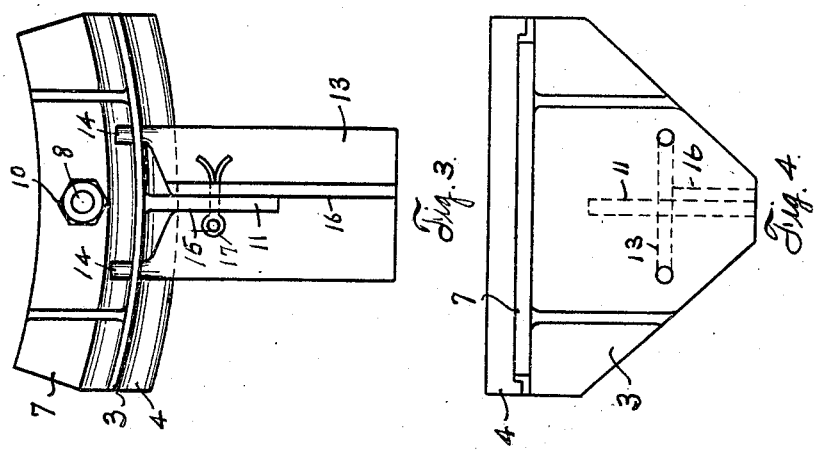
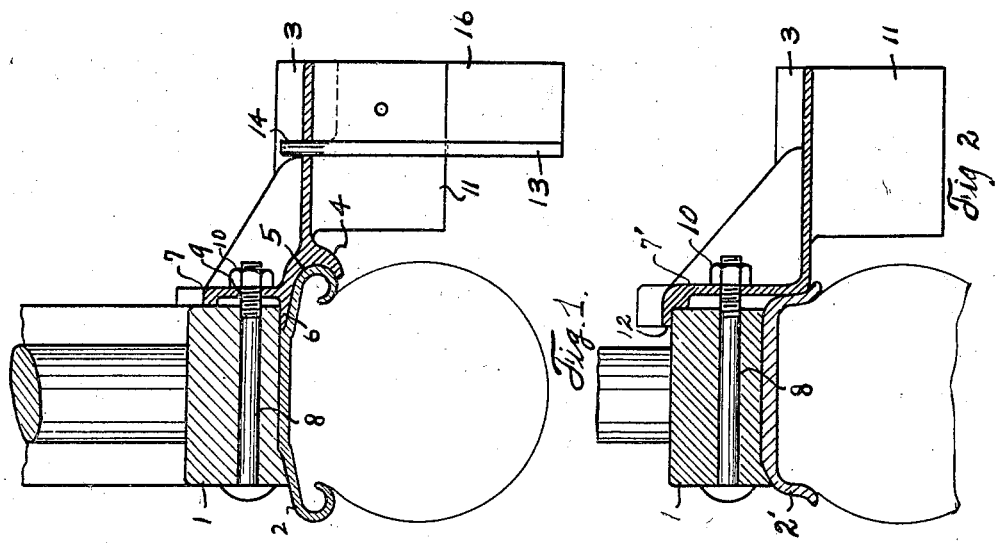
Inventors
Emil H Koenig
Frederick Camp
By
Hardway Cathy
Attorneys Patented June 17, 1924.

1,498,043

UNITED STATES PATENT OFFICE.

EMIL H. KOENIG, OF HOUSTON, AND FREDERICK CAMP, OF IOWA COLONY, TEXAS.

TRACTION LUG.

Application filed November 14, 1922. Serial No. 600,818.

*To all whom it may concern:*

Be it known that we, EMIL H. KOENIG and FREDERICK CAMP, citizens of the United States, residing at Houston and Iowa Colony, in the counties of Harris and Brazoria and State of Texas, have invented certain new and useful Improvement in Traction Lugs, of which the following is a specification.

This invention relates to new and useful improvements in an anti-skid traction lug.

One object of the invention is to provide an anti-skid device which has been specially designed for easy attachment to the traction wheel of a motor vehicle to prevent the skidding or spinning of the wheels in passing over muddy or slippery roads.

Another object of the invention is to provide an anti-skid device which may be attached to the outer edge of the wheel rim and will not in any way come in contact with the tire or injure the same.

The invention also embodies a detachable lug which is adapted to be applied to the wheel, if necessary, to prevent the skidding or side slipping of the vehicle.

With the above and other objects in view the invention has particular relation to certain novel features of construction and use, an example of which is given in this specification and illustrated in the accompanying drawings, wherein:—

Figure 1 shows a front view of the device applied to the vehicle wheel and shown partly in section.

Figure 2 shows a front view thereof applied to a wheel having a different type of rim from that shown in Figure 1.

Figure 3 shows an outside view of the shoe and,

Figure 4 shows a plan view.

In the drawing the numeral 1 designates the wheel felloe, and the numeral 2 designates the tire rim secured thereon and of the clincher flange type. The numeral 3 designates a plate which is arcuate to conform to the curve of the tire rim 2. In the form shown in Figure 1 the inner margin of this plate is formed with a rib 4 whose inner side has the groove 5 to receive the outer edge of the tire rim 2, and also has an inwardly projecting bead or edge 6 which fits in between the felloe 1 and the rim 2. A side plate 7 is formed integrally with the rib 4 and fits against the outer side of the felloe 1. In application to the wheel one of the lugs which holds the rim on the felloe is removed and the device is fitted in place so that the threaded end of the bolt 8 will fit through the opening 9 of the plate 7 and a nut 10 is then screwed onto said threaded end of the bolt 8 to clamp the device in place.

The plate 3 has an outwardly projecting fin 11 formed integrally therewith designed to cut down into the road surface to prevent the spinning of the wheel in passing over muddy or slippery roads.

In the type shown in Figure 2 the rim 2' is formed to receive the straight side casing, in common use, and the side plate 7' is formed to conform to this design of rim and has an inwardly extending flange 12 which fits inside of the felloe 1 to take the outward strain off of the bolt 8. This type of the traction lug is secured to the wheel in the same manner as hereinbefore explained. An ordinary nut as 10 may be used to clamp the device to the wheel.

One or more of the traction lugs may be secured to the wheel and will enable the vehicle to pull through mud or over slippery roads. It is to be observed that the lug does not clamp around the tire but is located on the outside thereof, and will not injure the tire. When hard surfaced roads are encountered the fin 11 will be held clear of the surface of the road and consequently the device need not be removed until the trip is completed or until there is no further need of it.

In case the contour of the road is such as to cause side slippage of the vehicle there is a supplemental lug 13 which may be employed. This lug has two prongs 14, 14 which may be fitted through holes in the plate 3 and has a central slot 15 to receive the fin 11. The lug 13 has a lateral flange 16 at right angles thereto which lies alongside the fin 11 and may be secured in place by means of a cotter pin 17 passing through said flange and fin. The lug 13 when secured in place stands at right angles to the fin 11 and is thus so disposed with a relation to the course of travel of the wheel as to prevent the side slipping of said wheel.

What I claim is:—

1. An anti-skid tractor lug formed with a radially extending fin, and having a side plate which lies alongside the wheel felloe, said plate being formed with an opening, an arcuate bead integral with the lug and fitting between the wheel rim and felloe, a bolt passing through said opening and a securing nut threaded onto said bolt to secure the lug on the wheel.

2. The combination with a wheel felloe and a tire rim thereon of an anti-skid device having a side plate fitted against the side of said felloe and rim, and conforming to the contour thereof, said plate having a groove to receive the edge of the rim, and a bead which fits between the rim and felloe, a bolt fitted through said felloe and plate, a securing nut threaded onto said bolt and securing said plate to the wheel and a radially projecting fin formed integrally with said device.

3. An anti-skid device formed with right angularly disposed integral plates, one of said plates being formed to fit against the outer side of a wheel felloe and rim, and provided with a bolt hole, a bead carried by said plate fitting between the rim and felloe, a bolt passing through the hole and securing the device to said wheel, a radial fin carried by the other plate, and a detachable lug carried by said last mentioned plate.

In testimony whereof we have signed our names to this specification in the presence of two subscribing witnesses.

EMIL H. KOENIG.
FREDERICK CAMP.

Witnesses:
  E. V. HARDWAY,
  E. E. FORD.